March 6, 1951     E. CANNON ET AL     2,543,759
AUTOMATIC PRESS

Filed July 20, 1948     6 Sheets-Sheet 1

INVENTORS.
Earl Cannon
John N. Heater
BY
Atty

March 6, 1951  E. CANNON ET AL  2,543,759
AUTOMATIC PRESS
Filed July 20, 1948  6 Sheets-Sheet 2

INVENTORS
Earl Cannon
John N. Heater
BY

March 6, 1951  E. CANNON ET AL  2,543,759
AUTOMATIC PRESS
Filed July 20, 1948  6 Sheets-Sheet 3
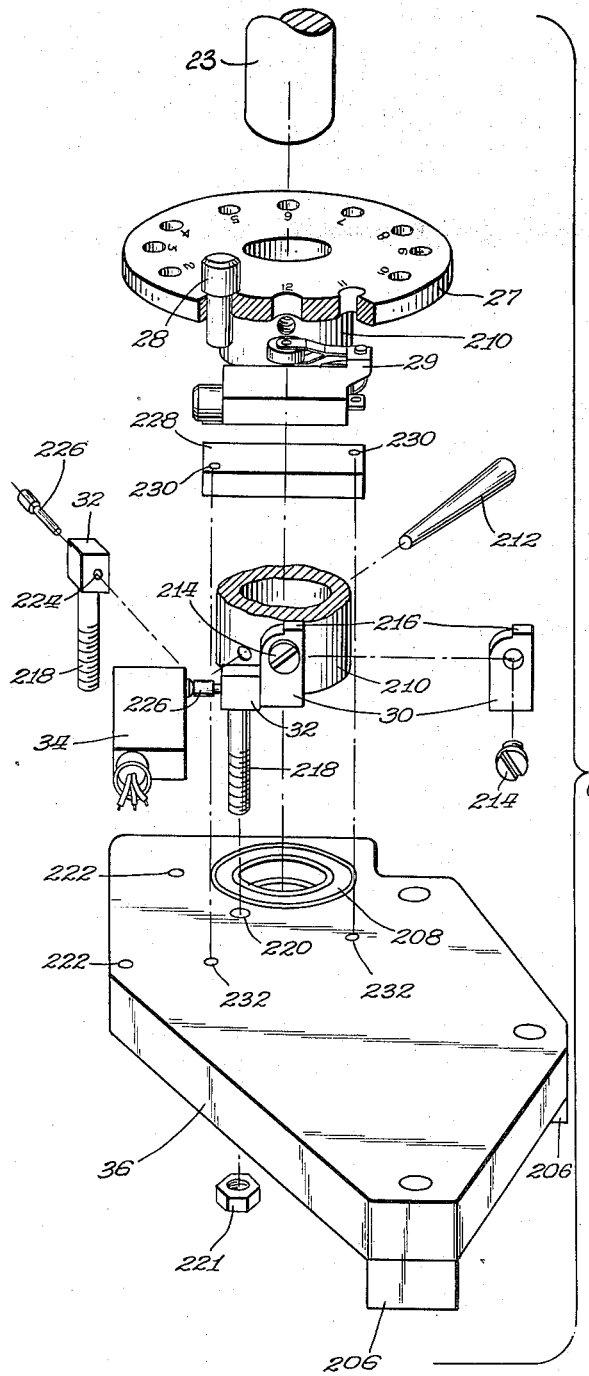
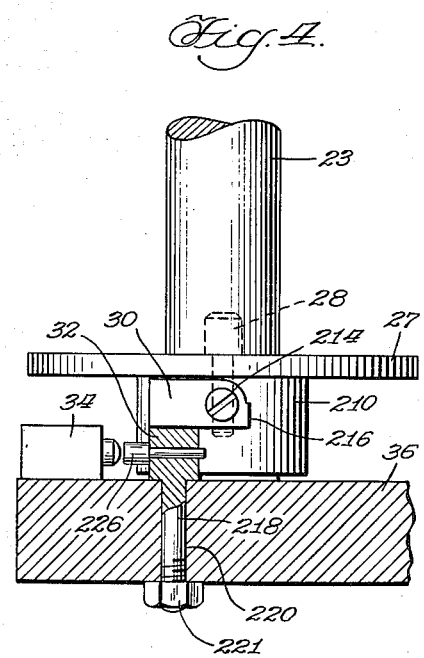
Fig. 4.
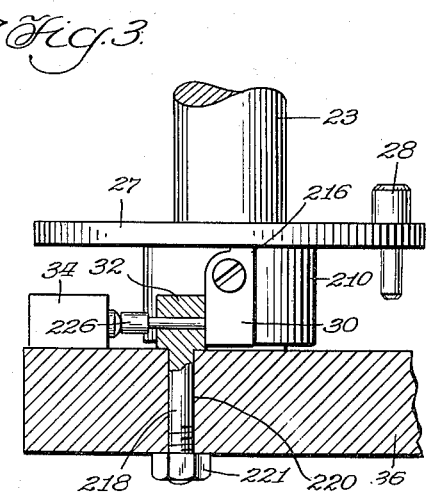
Fig. 3.
Fig. 5.
INVENTORS.
Earl Cannon
John N. Heater
BY March 6, 1951  E. CANNON ET AL  2,543,759
AUTOMATIC PRESS
Filed July 20, 1948  6 Sheets-Sheet 4

INVENTORS.
Earl Cannon
John N. Heater

March 6, 1951 — E. CANNON ET AL — 2,543,759
AUTOMATIC PRESS
Filed July 20, 1948 — 6 Sheets-Sheet 5
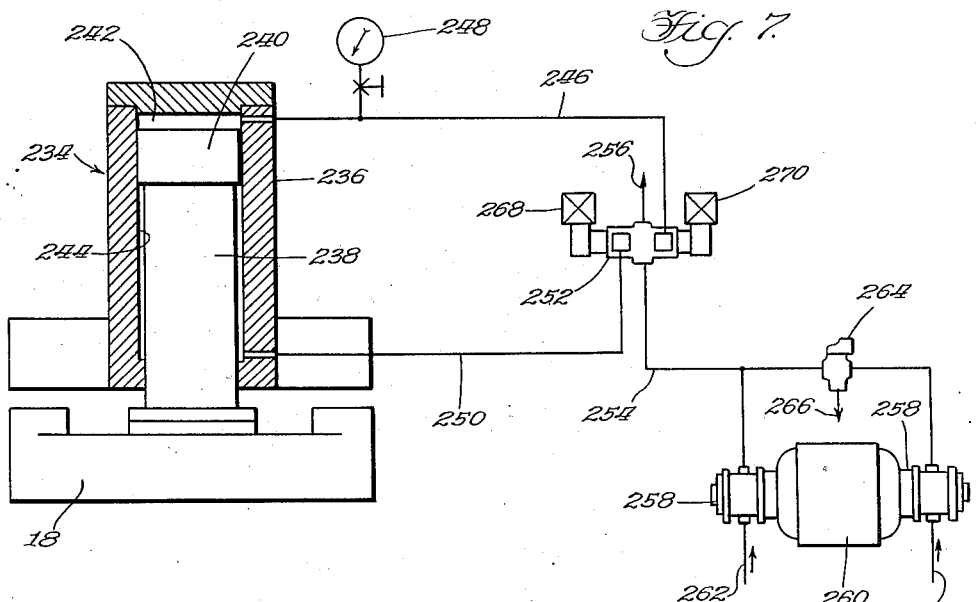
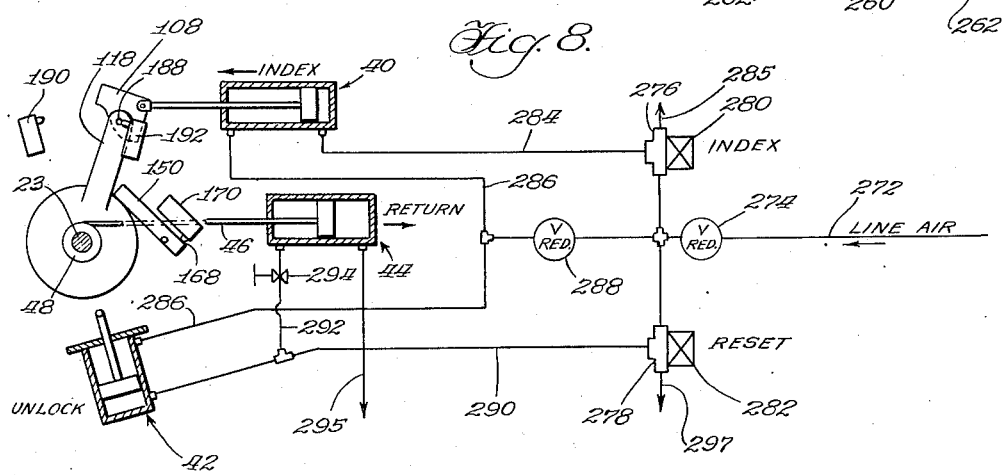
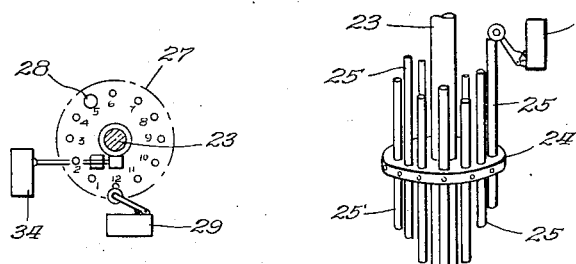
INVENTORS.
Earl Cannon
John N. Heater

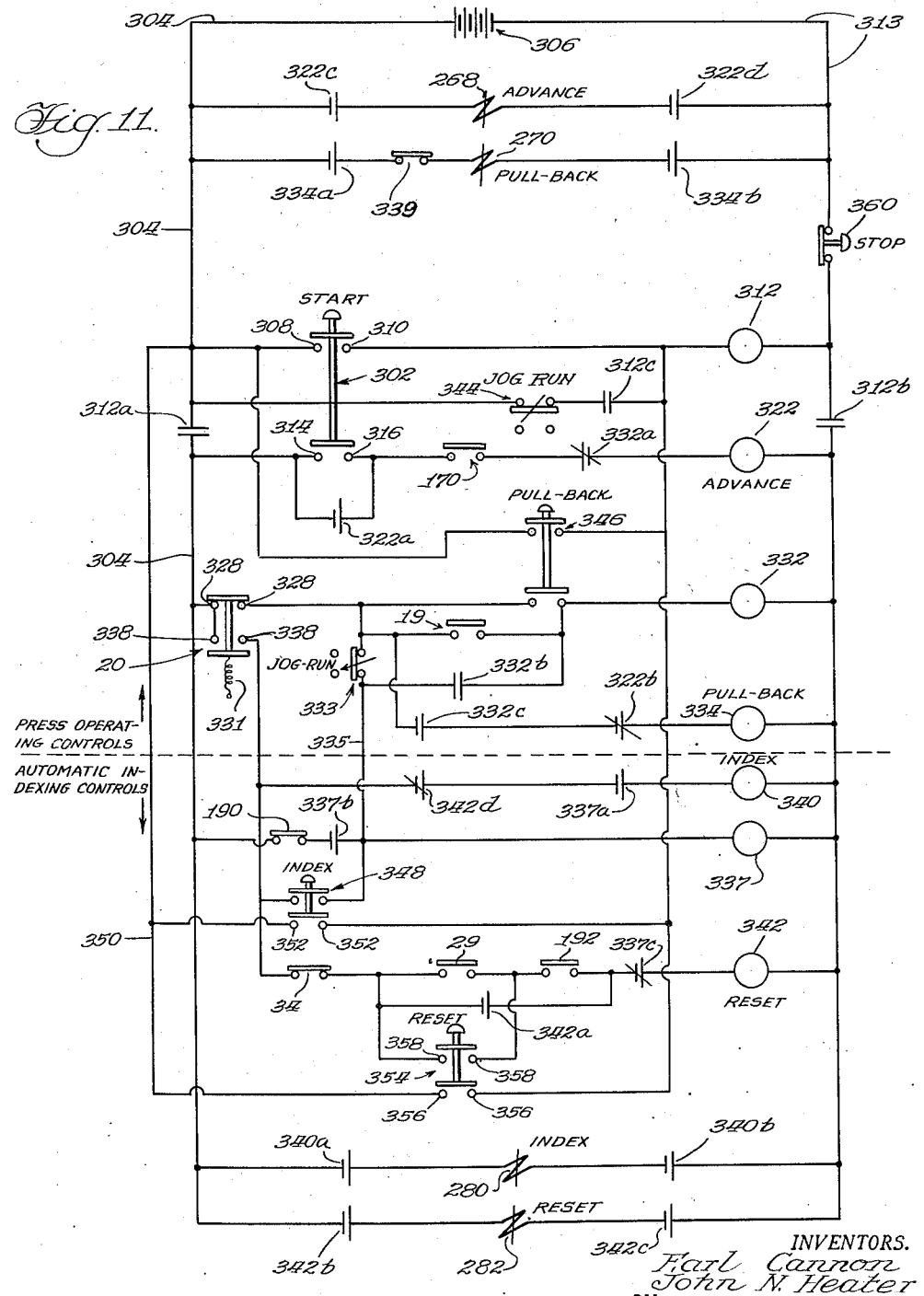

Patented Mar. 6, 1951

2,543,759

UNITED STATES PATENT OFFICE 2,543,759

AUTOMATIC PRESS

Earl Cannon, Downers Grove, and John N. Heater, Flossmoor, Ill., assignors to American Steel Foundries, Chicago, Ill., a corporation of New Jersey Application July 20, 1948, Serial No. 39,656

20 Claims. (Cl. 60—52.)

This invention relates to presses and more particularly to a novel control system for varying the stroke of a press platen on successive operations thereof.

A general object of the invention is to devise a novel compact press control mechanism for automatically varying the platen stroke on successive operations.

A more specific object of the invention is to provide a control mechanism of the above-described type wherein a plurality of control members are rotatably mounted for successive alignment with a platen mounted switch operatively connected to the platen operating mechanism for terminating the advance stroke of the platen.

A further object of the invention is to devise novel automatic means for returning the control members to their initial position after the platen has completed any predetermined number of strokes.

The foregoing and other objects and advantages of the invention will become apparent from a consideratiton of the following specification and the accompanying drawings, wherein:

Figure 3 is an exploded view of the lower portion of the control mechanism;

Figure 4 is a fragmentary sectional view through the lower support frame of the control mechanism with the stroke control device fragmentarily shown in elevation after maximum indexing rotation thereof;

Figure 5 is a view corresponding to Figure 4 with the stroke control device illustrated in return position after completion of a control cycle;

Figure 7 is a flow diagram of the hydraulic actuating system associated with the operating motor for the press platen;

Figure 8 is a flow diagram of the pneumatic actuating system for the control mechanism;

Figure 9 is a diagram of the limit pin disc and associated switches of the control mechanism;

Figure 10 is a diagram of the control rod disc and associated switches; and

Figure 11 is a wiring diagram of the electrical actuating circuits associated with the platen operating hydraulic system and with the pneumatic system for actuating the control mechanism.

Figure 1:
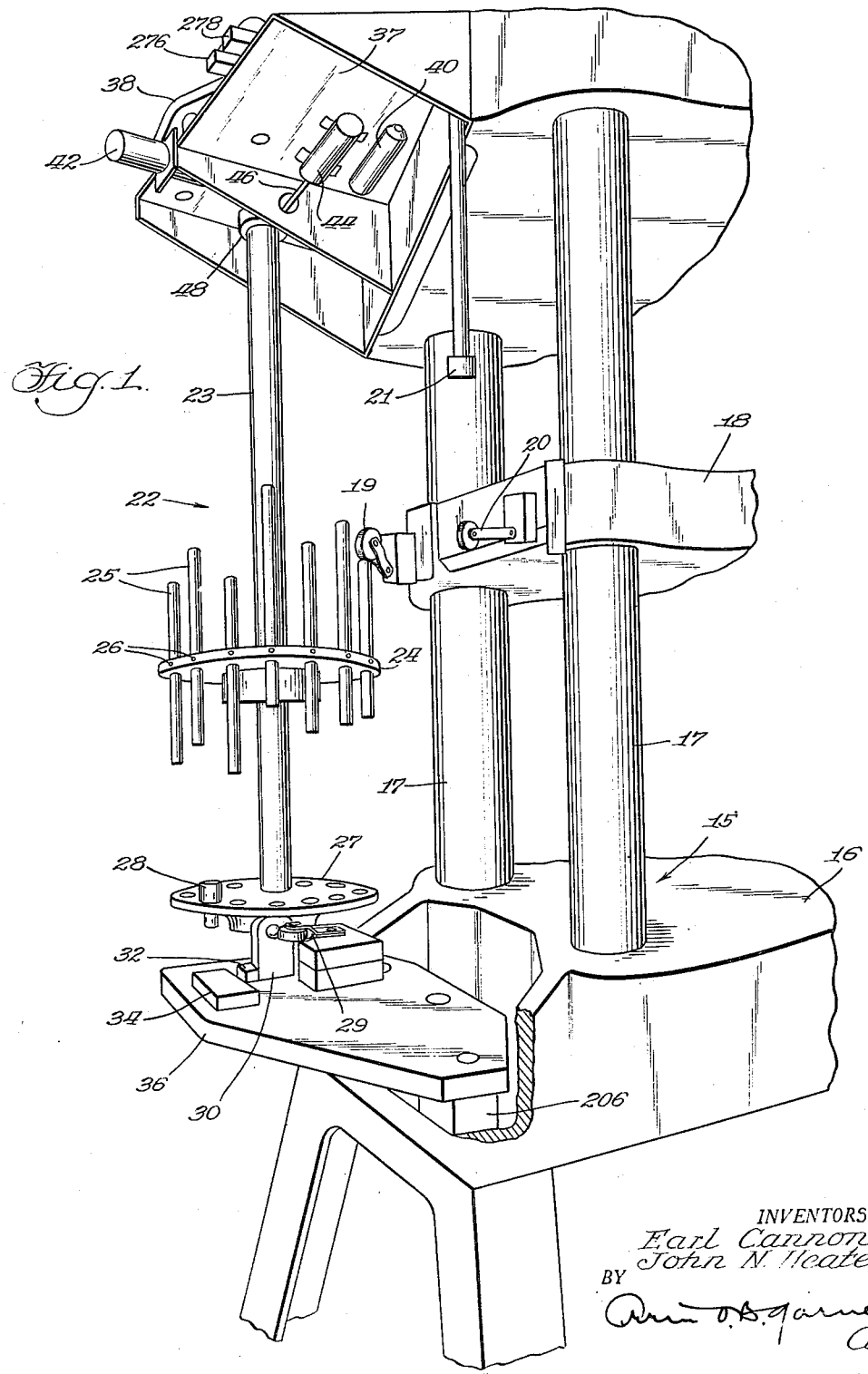
Figure 1 is a fragmentary perspective view of a novel tube bending press embodying the invention, portions of the structure being broken away for clarity.

Describing the invention in detail and referring first to the perspective view of Figure 1, the novel device comprises a press frame, generally designated 15, comprising a bed 16 and spaced columns 17 slidably engaged with a platen 18 to guide the same in its movement on advance stroke toward the bed and on return or pullback stroke from the bed, as hereinafter more fully described.

The platen 18 carries an advance limit switch 19 and a return limit switch 20, the latter being engageable with a frame mounted cam 21 to terminate the return stroke of the platen, as described in detail in connection with the operation of the press.

The advance stroke of the platen is adjustably limited by a control mechanism, generally designated 22. This device, as hereinafter described in detail and as generally illustrated in Figure 1, comprises a rotatable shaft 23 carrying a keyed support 24 preferably in the form of a disc having a plurality of control rods 25 slidably mounted in complementary openings or perforations through the disc for vertical adjustment with respect thereto. The rods are secured in adjusted position, as by set screws 26. The disc is rotatably indexed by rotation of the shaft 23, as hereinafter discussed, each rotatable position of the disc being adapted to align one of the rods 25 with the limit switch 19 to terminate the advance stroke of the platen and preferably to initiate the return stroke thereof, as hereinafter described in detail.

The lower end of the shaft 23 is provided with another keyed support 27 preferably in the form of a disc having a plurality of openings or perforations, numbered 1 to 12 (Figures 3 and 9), within which a switch actuator pin 28 is selectively receivable to actuate a normally open limit switch 29 which is associated with automatic operable means, hereinafter described, for effecting return of the discs 24 and 27 to their initial position.

The disc 27 also carries a pivoted dog or pawl 30 engageable with a stop 32 to limit the return movement of the discs and shaft 23, said dog being engageable with a limit switch 34 in the return position of the disc 27 for a purpose hereinafter described. The switches 29 and 34 and the stop 32 are mounted on a lower frame 36 supported by the press frame 15.

The upper end of the shaft 23 extends through a bracket 37 and is supported by a bearing plate 38 mounted on the bracket 37. The bracket supports an indexing power device 40 and an unlocking power device 42 operatively associated with the shaft 23, as hereinafter described in detail. The bracket 37 also supports a return power cylinder device 44 operatively connected to a chain 46 which is connected to a chain spool 48 keyed to the shaft 23 to actuate the latter on its return movement.

Figure 2:
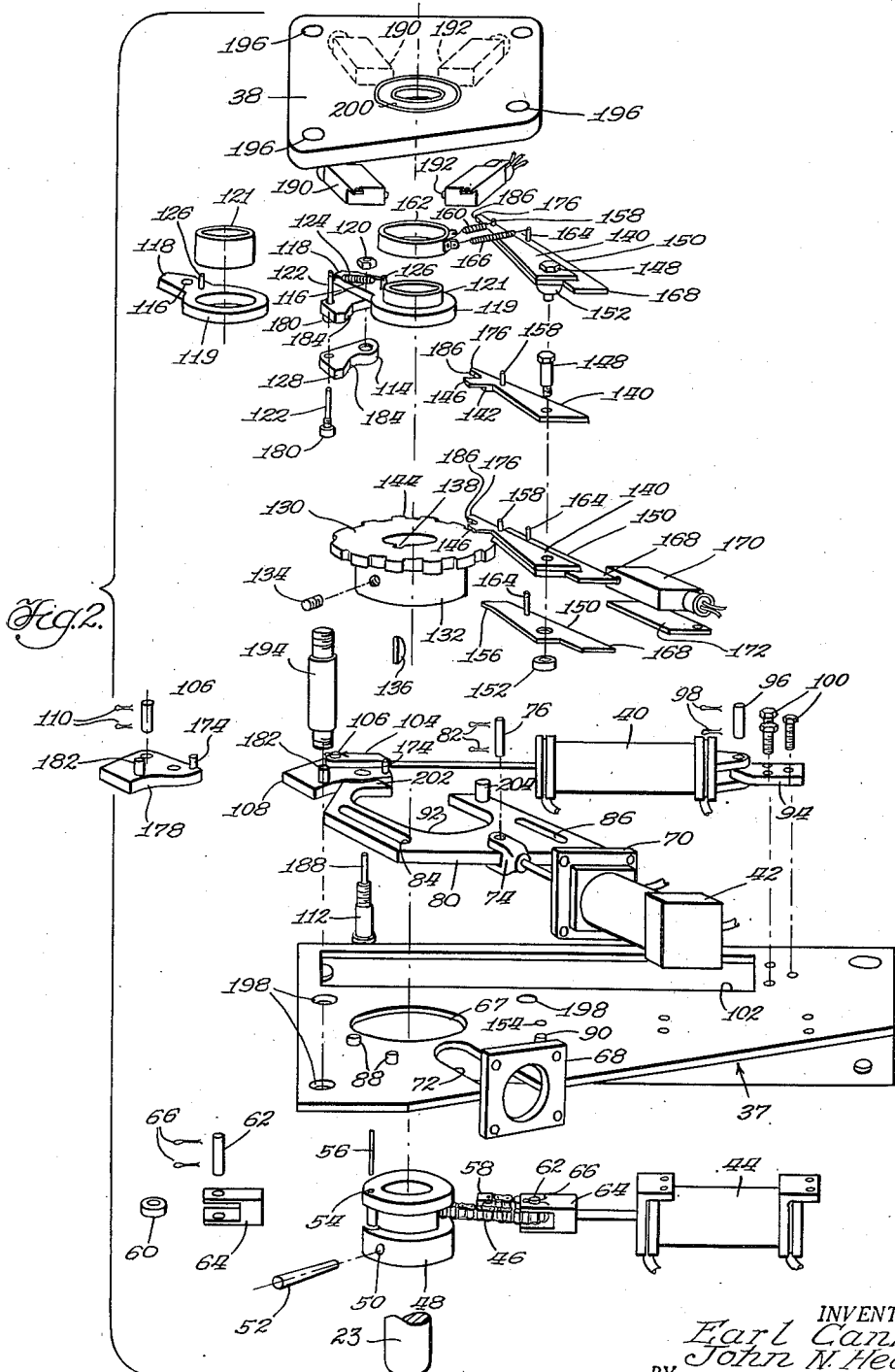
Figure 2 is an exploded view of the upper portion of the novel control mechanism.

Referring now to Figure 2 which is an exploded view of the upper portion of the control mechanism, it will be seen that the spool 48 is provided with a pin opening 50 for the reception of a complementary taper pin 52 adapted to key the spool to the shaft 23. The spool is also provided with a pin opening 54 adapted to receive a pin 56 which secures one end of the chain 46 to the spool, the opposite end of the chain being connected to a clevis 58 adapted to be welded to the under side of the bracket 37. The chain 46 is mounted intermediate its ends on a spool 60 rotatably mounted by a pin 62 within a clevis 64 which is operated by the return power device 44. The pin 62 is secured in position by cotter pins 66.

The bracket 37, as best seen in Figure 2, comprises an opening 67 for the shaft 23 and comprises a vertical support plate 68 to which the unlocking power device 42 is adapted to be bolted by means of a complementary plate or bracket 70. The bracket 37 is provided with a slot 72 within which a clevis or link 74 is reciprocal, said link being operatively connected to the device 42 and being pivotally connected by a pin 76 to an unlocking plate 80. The pin 76 is provided with retaining means in the form of cotter pins 82.

The unlocking plate 80 is adapted for slidable support on the bracket 37 and comprises a pair of elongated slots 84 and 86. The slot 84 is adapted to receive a pair of guide and limit pins 88 on the bracket 37, and the slot 86 is adapted to receive a guide and limit pin 90 on the bracket 37. Thus the unlocking plate may be reciprocated by the power device 42 and for this purpose is provided with an elongated slot 92 adapted to receive the hub 132 of ratchet wheel 130 and to afford clearance therefrom as the plate 80 is reciprocated to locked and unlocked positions, as hereinafter described, by the device 42. Reciprocation of the plate is limited by the pins 88 and 90.

The indexing power device 40 is adapted for pivotal connection to a support link 94 by a pivot pin 96 secured by cotter pins 98, and the link 94 is adapted to be secured to the bracket 37 by screws 100. The device 40 operates within a slot 102 in the bracket and is operatively connected to a link or clevis 104 pivotally connected by a pin 106 to a floating link 108 slidably supported on bracket 37, the pin being provided with cotter keys 110. The link 108 is adapted for pivotal connection by a link pin 112 to a ratchet pawl 114, which is slidably seated on the link 108. The pin 112 is adapted for reception within a complementary opening 116 in a rocker arm 118 and is provided with a lock nut 120. Thus the link 108, the pawl 114, and the rocker arm 118 are interconnected by the pin 112 for relatively pivotal movement. The rocker arm 118 comprises a hub 119 having a bushing 121 press fitted therein and adapted to receive the shaft 23.

The pawl 114 is provided with a screw 122 having its upper end connected by a tension spring 124 to a post 126 on the rocker arm whereby the tension spring 124 is operable to yieldingly urge a nose 128 of the pawl into engagement with a ratchet wheel 130 having a hub 132 adapted for reception in the bracket opening 67 and to be secured to the shaft 23 by a set screw 134. The ratchet wheel 130 is adapted to be keyed by a half moon key 136 having its flat side received within a complementary recess 138 within the wheel, the round side of the key 136 being adapted for reception within a complementary recess or slot (not shown) in the shaft 23.

The ratchet wheel 130 supports the hub 119 of rocker arm 118 and is releasably interlocked against rotation by a locking pawl 140 having a nose or lug 142 receivable between teeth 144 of the ratchet wheel 130 and having a guide flange 146 adapted to slidably engage the upper surface of the ratchet wheel. The locking pawl 140 is pivotally interconnected by a pin 148 to a backing pawl 150, said pin extending through a bearing or shim 152 and having a threaded connection to a complementary opening 154 in the bracket 37. Thus the pawls 140 and 150 are capable of relative pivotal movement on the pin 148. The pawl 150 is provided with a cam lug or nose 156 engageable between the teeth 144 of the ratchet wheel 130 and adapted to accommodate counterclockwise or indexing rotation of the wheel and to positively prevent clockwise or return rotation of the wheel until the backing pawl 150 is released by the unlocking plate 80, as is hereinafter described. The aforementioned nose or lug 142 of locking pawl 140 described as being receivable between the teeth 144 of the ratchet wheel 130 is adaptable to positively prevent clockwise or indexing rotation of the wheel 130 until released by means hereinafter described.

The pawl 140 comprises a post 158 connected by a tension spring 160 to a collar 162 adapted to be sleeved on the shaft 23 in a telescopic relationship with the bushing 121, and the pawl 150 comprises a similar post 164 connected by a tension spring 166 to the collar 162 whereby the springs 160 and 166 are operative to yieldingly urge the pawls 140 and 150 into interlocking engagement with the ratchet wheel 130 thereby releasably preventing rotation thereof in either direction. The collar 162 is adapted to slidably seat on the hub 119 of the ratchet wheel 130.

It may be noted that the pawl 150 comprises a lug or actuator nose 168 engageable with a normally open limit switch 170 adapted to be supported by a shim or seat 172 on the bracket 37 and serving a purpose hereinafter described in connection with the operation of the press.

Figure 6:
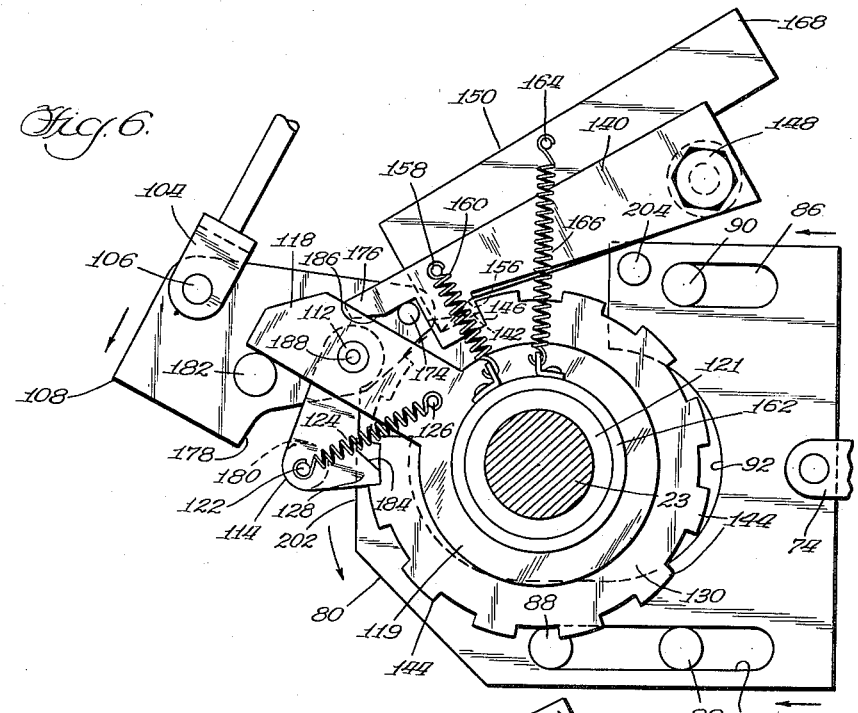
Figure 6 is a top plan view of the indexing and unlocking assembly of the control mechanism.

The ratchet wheel 130 and shaft 23 are indexed by rotation in a counterclockwise direction upon actuation of the power cylinder device 40 to advance position. Actuation of device 40, as best seen in Figure 6, rotates the floating link 108 on pin 112 relative to the ratchet pawl 114 inasmuch as pin 112, being held by ratchet pawl 114 engaged in ratchet wheel 130 rotatively held by the locking pawl 140, cannot move. Such rotation of floating link 108 engages an actuator post or pin 174 of the link 108 with an arm or lug 176 of the locking pawl 140 to release said pawl from engagement with the teeth of the ratchet wheel 130 against the resistance of spring 160 whereupon a shoulder 178 of the link engages a head 180 of the pin 122 thereby rotating the ratchet pawl 114 and ratchet wheel 130 until the lug 142 of the locking pawl 140 (said pawl having been released from pin 174 of link 108 by virtue of the link's translatory motion rotatively about the center of shaft 23) engages the next ratchet tooth 144, stopping the rotative motion. The ratchet wheel is now so positioned as to allow the nose 156 of the backing pawl 140 to engage behind a tooth and hold the wheel as the ratchet pawl 114 and link 108 are retracted.

On the retraction or pullback stroke of the device 40, the link 108 rotates about the pin 112, and an actuator post or pin 182 of the link engages the rocker arm 118 rotating the arm and the pawl 114 in a clockwise direction relative to the ratchet wheel 130 which is held by the backing pawl 150 as a cam surface 184 (Figures 6 and 6A) of the ratchet pawl nose 128 slides over the engaged tooth 144 of the wheel. At this time the post 174 of the link engages a cam surface 186 of the locking pawl 140 to accommodate movement of the link 108 to retracted position, preparatory to another indexing operation by the power cylinder device 40.

It may be noted that the pivot pin 112 connecting the link 108, the pawl 114, and the rocker arm 118 is provided with a switch actuator stem 188 adapted to actuate a normally closed switch 190 (see also Figure 8) at the end of the advance stroke of the device 40 and to actuate a normally open switch 192 at the end of the retraction stroke of the device 40 for a purpose hereinafter described. The switches 190 and 192, as best seen in Figure 2, are mounted on the under side of the upper bearing plate 38 which is mounted by a plurality of posts 194 having threaded connection with complementary openings 196 in the bearing plate 38 and with complementary threaded openings 198 in the bracket 37. The bearing plate 38 comprises a conventional bearing 200 (Figure 2) for the upper end of the shaft 23.

Figure 6A:
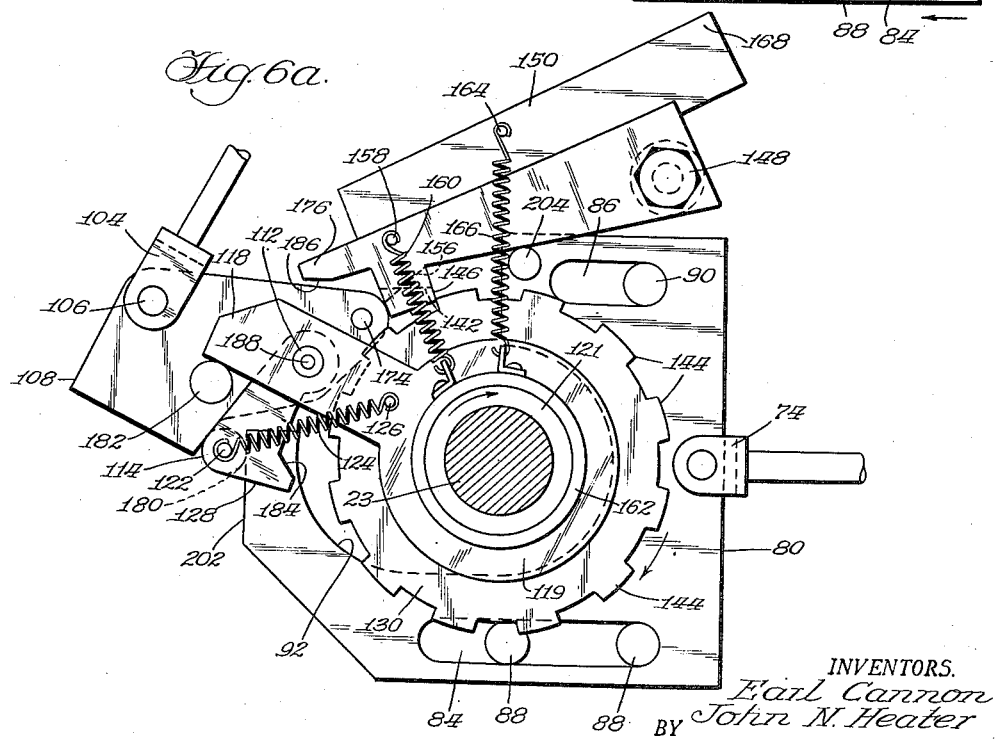
Figure 6A is a view comparable to Figure 6, with the indexing mechanism unlocked by the unlocking assembly.

The locking plate 80 on the advance or unlocking stroke of the unlocking power device 42 is adapted to release all of the pawls 114, 140, and 150 with respect to the ratchet wheel, as shown in Figure 6A, to accommodate clockwise movement of the wheel and shaft 23 to return position, as hereinafter described. For this purpose the unlocking plate 80 is provided with a cam or lug 202 normally affording slidable support for the nose 128 of ratchet pawl 114, as seen in Figure 6, said cam 202 being engageable with the head 180 of the pin 122 to release the pawl 114, as shown in Figure 6A. The plate 180 is also provided with an actuator post or pin 204 engageable with the inner sides of the pawls 140 and 150. Thus as the plate 80 is advanced, the lug 202 thrusting against the pin 122 is operable to release the pawl 114 and the post 204 sliding against the inner sides of the pawls 140 and 150 is operable to release said pawls, whereupon actuation of the return cylinder 44, as hereinafter described, is operable to rotate the spool 48 and shaft 23 in a clockwise direction to return position.

Figure 3 is an exploded view of the lower portion of the control mechanism and it will be seen in this figure that the support frame 36 is preferably a flat member formed, for example, of steel plate and is provided with legs 206 adapted to seat on the press bed 16. The frame 36 comprises a bearing 208 for the lower end of the shaft 23, to which a hub 210 of the pin disc 27 is adapted to be keyed by a taper pin 212. Figure 3 also shows the detailed construction of the dog 30 and the manner in which the latter is pivoted on a pin 214 having threaded engagement with the hub 210 of the pin disc; and it will be noted that the dog 30 comprises a nose or lug 216 at one side of its pivotal axis adapted to engage the under side of the disc 27 for a purpose hereinafter described. Figure 3 also shows the limit switch 34 and the stop 32 which is in the form of a head on a pin 218 adapted for reception within a complementary opening 220 in the frame 36. A retainer nut 221 is provided for the threaded lower end of pin 218. The switch 34 is adapted for securement to the frame by screws (not shown) extending through complementary openings 222 of the frame 36. The stop head 32 of the pin 218 is provided with an opening 224 for the reception of a plunger 226 adapted to actuate the switch 34 upon engagement of the dog 30 with the stop 32, as clearly seen in Figures 3, 4 and 5, and as hereinafter described in connection with the operation of the dog 30.

Figure 3 also shows the switch 29 which is provided with a pad or seat 228 and is adapted for securement by screws (not shown) extending through complementary openings 230 in the pad and 232 in the frame 36. It may be noted that Figure 3 shows the openings in the disc 27, numbered from 1 to 12, with the pin 28 in opening number 1; however, it will be understood that this pin may be inserted into any one of the twelve numbered openings to contact and actuate the switch 29 after a predetermined number of indexing operations of the shaft 23, by the index power device 40 and associated actuating mechanism.

Figure 4 is a sectional view through the frame 36 showing the pin disc 27 and dog 30 in the maximum indexed position, with the pin 28 in the number 12 opening of the disc 27, after the disc and shaft 23 have been indexed twelve times; and it will be seen that under these conditions the dog 30 has been rotated by engagement with the stop 32 to accommodate indexing of the shaft 23 to the twelfth rotational position thereof.

Figure 5 is a view similar to Figure 4 showing the pin disc 27 and shaft 23 in return position preparatory to initiation of a press cycle. Under these conditions the dog 30 is engaged with the stop 32, thereby actuating the plunger 226 and return limit switch 34, the nose 216 of the dog being engaged with the underside of the plate of the disc 27 to stop the return movement of the latter.

Referring now to Figure 7, the hydraulic actuating circuit associated with the platen 18 is diagrammatically illustrated and comprises an hydraulic motor, generally designated 234, including a cylinder 236 and a ram 238 having a head 240 defining advance and return chambers 242 and 244 within the cylinder 236. The advance chamber 242 is connected to an advance line 246 containing a pressure indicator gauge 248, and the return chamber 244 is connected to a return line 250, said lines being connected to a conventional operating valve 252 having connections to a supply line 254 and to a discharge or exhaust line 256 which may be connected, for example, to an associated low pressure tank or reservoir (not shown) of hydraulic fluid, such as oil. If desired, a conventional holding valve (not shown) may be provided in line 250 to accommodate unrestricted flow of fluid to the chamber 244 and to prevent flow of fluid therefrom until a predetermined pressure value is developed therein, to hold the ram in its illustrated position.

The supply line 254 is connected to an associated source of pressure fluid, illustrated in Figure 7 as a pair of pumps 258 operated by a motor 260 and having their discharge sides connected to the supply line 254, the suction side of the pumps being connected by suction lines 262 to an associated supply of hydraulic fluid (not shown), such as, for example, the above-mentioned reservoir. The line 254 comprises a safety relief valve 264 adapted to discharge through a relief line 266 upon development of a predetermined maximum pressure value within the line 254.

The valve 252 is actuated to advance position by a solenoid 268 whereupon the valve delivers pressure fluid from the supply line 254 to the advance line 246 and exhausts fluid from the return line 250 to the discharge line 256, thereby actuating the ram 238 and platen 18 on the advance or down stroke thereof as illustrated in the drawings. The valve 252 is actuated to return or pullback position by a solenoid 270, whereupon pressure fluid is delivered by the valve from the supply line 254 to the return line 250 and fluid is exhausted from the advance line 246 to the exhaust or discharge line 256, thereby actuating the platen 18 on the return or pullback stroke thereof, as hereinafter described in connection with the operation of the press.

Referring now to Figure 8 which is a piping diagram of the pneumatic actuating system associated with the above-described index and return mechanisms, this system comprises a pneumatic supply line 272 which may be a conventional shop air line connected to an associated source of pneumatic pressure, such as a compressor (not shown). The line 272 is provided with a pressure regulator valve 274 and is connected downstream of said valve to a pair of operating valves 276 and 278 operated respectively by solenoids 280 and 282. The valve 276 is connected by a delivery line 284 to the indexing power device 40 and is adapted in advance position to actuate the device 40, thereby advancing the rocker arm 118. In release position of the valve 276, the line 284 is exhausted through an exhaust line 285, whereupon the rocker arm 118 is returned or retracted by pneumatic pressure delivered to the device 40 from a delivery line 286 having a pressure regulator valve 288. The line 286 is connected upstream of the valve 288 to the supply line 272. The regulator valves 274 and 288 are preferably regulated so that the pressure delivered to the valves 276 and 278 is substantially greater than the pressure delivered to the line 286, so that the device 40 may be advanced against the constant pressure in the line 286.

The valve 278 is connected to a delivery line 290 having a connection to the unlocking power device 42 for advancing the same in the advance position of the valve 278 upon energization of solenoid 282, whereat pressure is delivered from the line 272 to the line 290 thereby advancing the device 42 against the constant pressure in the line 286. The line 290 is also connected by a branch line 292 having a regulator valve 294 to the return power device 44 for actuating the same on its return stroke, as hereinafter described in connection with the operation of the press. The device 44 is provided with an exhaust line 295 to facilitate actuation by the pressure fluid in line 292. De-energization of solenoid 282 opens line 290 to a discharge line 297, thereby accommodating the retraction stroke of device 42 by pressure in line 286.

Referring now to Figures 7 to 11 inclusive, an operating cycle of the novel press is hereinafter described in connection with the description of the wiring diagram of Figure 11. Assuming that the pin 28 is inserted in hole number 5 of the disc 27 and that the disc is in the return position diagrammatically shown in Figure 9, with hole numbered 12 aligned with the switch 29, the first advance stroke of the platen is terminated by engagement of its switch 19 with the control rod 25 which is aligned with hole number nine of the disc 27.

The advance stroke of the platen is initiated by closing a normally open double switch 302 which may be operated manually or by a foot pedal. As the switch 302 closes, it establishes a circuit which may be traced from a main lead 304 having a connection to one terminal of a conventional voltage supply 306 and through contacts 308 and 310 of the switch 302, through a solenoid 312 which is connected to another main lead 313 having a connection to the opposite terminal of the voltage supply 306.

Energization of solenoid 312 closes three relay switches responsive thereto, said switches being indicated at 312a, 312b, and 312c, the latter establishing a holding circuit through the solenoid 312.

Closing of switch 302 also connects contacts 314 and 316, thereby closing a circuit through the above-mentioned normally open switch 170 closed under these conditions by the backing pawl 150 in its locked position. This circuit may be traced through lead 304, a normally closed switch 332a and through a solenoid 322 and lead 313. Energization of solenoid 322 closes relay switch 322a establishing a holding circuit through the solenoid 322 and opens a normally closed switch 322b for a purpose hereinafter described.

Energization of solenoid 322 also closes relay switches 322c and 322d energizing the before-mentioned advance solenoid 268 of the hydraulic operating valve 252 actuating the same to advance position whereat the platen 18 is advanced downwardly toward the work (not shown).

The ram moves on its advance stroke until the above-mentioned switch 19 is closed by contact with the indexed control rod 25, whereupon a circuit is established through normally closed contacts 328 of the switch 20 and through switch 19 and a solenoid 332. Energization of solenoid 332 opens the before-mentioned switch 332a breaking the circuit through solenoid 322 thereby restoring its associated switches to normal position. Thus, as switches 322c and 322d open, the advance solenoid 268 of the hydraulic operating valve 252 is de-energized.

Energization of solenoid 332 by closing of the switch 19 also closes a relay switch 322b establishing a holding circuit through the solenoid 332 and closes a relay switch 332c which (upon closing of switch 322b as solenoid 322 is de-energized by opening of switch 332a) establishes a circuit through a solenoid 334. Energization of the solenoid 334 closes its normally open relay switches 334a and 334b energizing the return solenoid 270 actuating the hydraulic operating valve 252 to the return position thereof, whereat the platen 18 is actuated on the return or pullback stroke thereof away from the work. If desired, a switch 339 may be provided and when open will hold the ram in advance position, until the switch 339 is actuated by the operator to close the circuit through solenoid 270.

As the ram reaches the top of its return or pullback stroke, the switch 20 is actuated by the cam 21, disconnecting the contacts 328 thereby breaking the holding circuit through the solenoid 334, whereupon the normally open switches 334a and 334b are released to open position, de-energizing the solenoid 270 whereupon the hydraulic operating valve 252 returns to neutral position and the platen 18 stops at the end of its return stroke.

It may be noted at this point that the initial closing of switches 312a and 312b and the moving of switch 20 away from cam 21 on the downward movement of platen 18 establishes another circuit through the normally closed contacts 328 of the switch 20 which is spring-pressed to the normal position shown in Figure 11 by a spring 331, and this circuit its traced through a jog-run switch 333 and a lead 335 through a solenoid 337 and the main lead 313. Energization of the solenoid 337 closes switches 337a and 337b, the latter establishing a holding circuit through the solenoid 337. Energization of solenoid 337 also opens a normally closed switch 337c for a purpose hereinafter described. Thus at the start of the first operation, closing of switches 312a and 312b by energization of solenoid 337 closes switch 337a and opens switch 337c and upon actuation of switch 20 at the end of the return stroke of the platen, the disconnection of contacts 328 is not effective to de-energize the solenoid 337 inasmuch as the switch 337b is connected through the abovementioned limit switch 190 to the main lead 304, which is connected to the voltage supply 306 because the switch 312a is closed.

Actuation of switch 20 by the cam 21 connects contacts 338 closing a circuit through a normally closed switch 342d, through the switch 337a, and through a solenoid 340. Energization of the solenoid 340 closes normally open relay switches 340a and 340b, thereby energizing the beforementioned solenoid 280 to actuate the indexing power device 40 on the advance stroke thereof thereby indexing the shaft 23 counterclockwise to align the next successive rod with the switch 19, said rod being aligned with hole numbered 10 in disc 27.

When the index power device 40 reaches advance position, the switch actuator 188 of rocker arm pin 112 opens the normally closed switch 190 breaking the holding circuit through the solenoid 337 returning its associated switches to normal position and thereby breaking the circuit through the solenoid 280 to accommodate actuation of the power device 40 and associated indexing mechanism to return position preparatory to another advance operation of the platen which is limited by the afore-mentioned control rod.

After the fifth operation, upon return of the platen to return position and after the holding circuit through the solenoid 337 has been broken due to opening of the switch 190 by the actuator 188, the pin 28 has closed the switch 29, and the actuator 188 has closed the normally open limit switch 192 thereby establishing a circuit through a solenoid 342 inasmuch as the normally closed relay switch 337c is now in closed position and the switch 34 is normally closed. Energization of the solenoid 342 closes a normally open relay switch 342a establishing a holding circuit through the solenoid 342 and closes normally open relay switches 342b and 342c, establishing a circuit through the before-mentioned solenoid 282 thereby actuating the unlocking power device 42 to advance position and consequently operating the unlocking plate 80 to release the ratchet wheel 130 from engagement with its associated pawls, whereupon the pressure in line 292 of the return power device 44 operates to actuate the same on the return stroke thereof, rotating the spool 46 and shaft 23 clockwise to return position until the dog 30 engages the plunger 226, as seen in Figure 5, thereby opening the switch 34 and breaking the circuit through solenoid 342. De-energization of solenoid 342 returns its switches to normal position and the press is now in position for a new cycle of operations.

It may be noted that a jog-run switch 344 is provided in the connection between the relay switch 312c and the main lead 304, and it will be understood that upon opening of the jog-run switch 344 and the before-mentioned jog-run switch 333, the platen may be advanced in small increments for the purpose of pre-adjusting dies, without initiating the automatic sequence of operations. This operation of the platen is accomplished by momentarily closing the switch 302 which simultaneously establishes circuits through the solenoids 312 and 322 thereby energizing the advance solenoid 268 of the hydraulic operating valve 252 without establishing the automatic control circuits through the jog-run switches 344 and 333.

With the jog-run switches open, the ram may be retracted or returned in small increments by momentarily closing a switch 346 which simultaneously establishes circuits through solenoids 312 and 332 thereby energizing the return solenoid 270 of the hydraulic operating valve 252.

In similar manner with the jog-run switches open and the ram in return position with the switch 20 connecting the contacts 338, the index power device 40 may be operated without actuation of the press parts by momentarily closing an index switch 348 which simultaneously closes a circuit through the solenoid 337 and the solenoid 312, the latter circuit being traced through a branch lead 350 of the main lead 304, through contacts 352 of the switch 348, and through the solenoid 312 and main lead 313.

With the jog-run switches open and the ram in return position, so that cam 21 is actuating switch 20 to close contacts 338, the shaft 23 may be reset to the original position shown in Figures 5 and 9 by means of a reset switch 354 which when closed establishes a circuit through branch lead 350 of main lead 304, through contacts 356 of the switch 354 and through solenoid 312 and main lead 313 thereby closing relay switches 312a and 312b to accommodate another circuit which may be traced from main lead 304 through contacts 338 of switch 20, through normally closed limit switch 34, through contacts 358 of switch 354 and thence through switch 192, normally closed switch 337c and solenoid 342 to main lead 313. Energization of solenoid 342, as above described, closes relay switches 342b and 342c energizing solenoid 282 to advance the unlocking power device 42 and unlocking plate 80, thereby accommodating return movement of power device 44 as the unlocking plate releases the ratchet wheel 130 from its associated pawls.

An emergency switch 360 is provided in the main lead 313 for stopping the press at any point in its operating cycle under emergency conditions.

It may be noted that the switch 170 which is normally open also provides a safety feature in the event that the shaft 23 is in a position whereat one of the control rods is not properly aligned with switch 19. Under these conditions the backing pawl 150 will be held in such a position by one of the ratchet teeth 144 that the nose 168 of the pawl will not engage the switch 170 thereby preventing closing of the latter and consequently preventing energization of advance solenoid 322 upon actuation of the starting switch 302 by the operator.

Thus it will be seen that we have devised a novel control mechanism for automatically varying the stroke of a press platen or similar working member on successive operations of the latter.

The novel control is adapted to afford a predetermined maximum number of variable operations and to afford any predetermined number of variable operations within said maximum, and by virtue of the rotational operation of the mechanical control parts, we have provided a control mechanism of the above-described type which is extremely compact and capable of simple adjustment to regulate the varying stroke of the platen and to regulate the number of strokes in each operating sequence.

We claim:

1. A control mechanism for an hydraulic system with an hydraulic motor having cylinder means and ram means presenting spaced advance and return areas in said cylinder means, and valve means for alternately delivering pressure fluid to and exhausting pressure fluid from respective areas; comprising the combination of operating means for shifting said valve means to advance position whereat pressure fluid is delivered to said advance area, a control mechanism including a rotatable shaft extending generally parallel to the path of said ram means, a plurality of control rods carried by said shaft and adjustable longitudinally thereof, control means carried by said ram means for actuating said valve means to reverse position whereat pressure fluid is delivered to said return area, each of said rods being indexed with said control means in one rotational position of the shaft to limit the advance stroke of said ram means by actuating said control means upon engagement of said rod therewith, a plurality of control stations carried by said shaft and corresponding to said rods, limit means selectively receivable at respective stations, a ratchet keyed on said shaft, a backing pawl adapted to accommodate rotational movement of the ratchet in one direction and to positively prevent rotational movement in the other direction, a locking pawl engageable with the ratchet to positively prevent rotational movement thereof in said one direction, an indexing pawl engaged with the ratchet and adapted on respective strokes of said indexing pawl to index successive rods with said control means, a second control means responsive to position of said ram means and operatively connected to the locking pawl and the indexing pawl for releasing the former and effecting one stroke of the latter after each return stroke of said ram means, and means for returning the rods to initial position comprising means operable by said limit means and operatively connected to said pawls and shaft for releasing all of said pawls and for rotating said shaft in said one direction, and means carried by the shaft for stopping rotation thereof in said one direction after said shaft and rods have reached their initial position.

2. A control system for an hydraulic motor including cylinder means and ram means presenting spaced advance and return areas in said cylinder means, said system comprising valve means for alternately delivering pressure fluid to and exhausting pressure fluid from respective areas, means for shifting said valve means to advance position whereat pressure fluid is delivered to said advance area, a plurality of contacts, control means carried by said ram means and operatively connected to said valve means for shifting the latter upon engagement of a contact by said control means whereby the valve means is actuated to return position thereof whereat pressure fluid is delivered to the return area and is exhausted from the advance area, and means responsive to position of said ram means for successively indexing respective contacts with respect to said control means upon successive movements of the ram means to return position.

3. A system, according to claim 2, wherein means are provided for automatically returning said contacts to initial position after a predetermined adjustable number of said contacts have been indexed.

4. A control system for an hydraulic motor having cylinder means and ram means presenting spaced advance and return areas in said cylinder means, said system comprising valve means adapted in advance position thereof to deliver hydraulic pressure fluid to the advance area while exhausting the return area and adapted in return position to deliver hydraulic pressure fluid to the return area while exhausting the advance area, means for shifting said valve means to advance position, a plurality of contacts, control means carried by said ram means and operatively connected to said valve means for shifting the latter to return position by engagement of said control means with said contacts, and means for shifting said contacts for successively aligning respective contacts with said control means.

5. A system, according to claim 4, wherein means are provided for returning said contacts to initial position after a predetermined number of said contacts have been engaged by said control means.

6. A control mechanism for an hydraulic system with an hydraulic motor having cylinder means and ram means presenting spaced advance and return areas therein, and valve means for alternately delivering pressure fluid to and exhausting pressure fluid from respective areas, comprising operating means for shifting said valve means to advance position whereat pressure fluid is delivered to said advance area, a control mechanism comprising a rotatable shaft, a plurality of control rods carried by said shaft, control means carried by said ram means for actuating said valve means to reverse position whereat pressure fluid is delivered to said return area, each of said rods being indexed with said control means in one rotational position of the shaft for engagement with said control means to actuate the same.

7. A control mechanism, according to claim 6, wherein the rods are adjustable in a direction generally parallel to the path of the ram means to adjustably predetermine the advance stroke thereof.

8. A control mechanism, according to claim 6, wherein means are associated with the shaft for automatically returning the shaft and rods to their initial position after a predetermined number of ram strokes.

9. A control mechanism, according to claim 6, wherein means are provided for automatically rotating the shaft to a different rotational position thereof at the end of each return stroke of said ram means.

10. A control mechanism, according to claim 9, wherein means are provided for rotating the shaft and rods to their initial position after a predetermined number of ram strokes.

11. A control mechanism for an hydraulic device having a working member and an hydraulic motor operatively associated therewith for advancing and retracting said working member, comprising the combination of a rotatable shaft, a plurality of control members rotatable therewith, control means movable with the working member and engageable with said control members and operatively connected to said motor for initiating a return stroke of the working member, and means operatively connected to said shaft for successively indexing said control members with said control means.

12. A control mechanism, according to claim 11, wherein means responsive to position of the working member are provided for actuating said indexing means to effect a predetermined rotational movement of the shaft at the termination of each return stroke of the working member.

13. A mechanism, according to claim 12, wherein means are provided responsive to the position of the shaft for initiating return thereof to its initial position after said shaft has been rotated by the indexing means through a predetermined rotational distance.

14. A control mechanism for an hydraulic press device comprising a working member and an hydraulic motor operatively associated therewith for advancing and retracting said member; comprising the combination of control means carried by the working member and operatively connected to the motor for initiating the retraction stroke of said member, a plurality of limit elements engageable with said control means for actuating the same, and means for successively indexing said elements with said control means.

15. A mechanism, according to claim 14, wherein means are provided for automatically actuating the indexing means at the termination of each retraction stroke of the working member.

16. A mechanism, according to claim 14, wherein means are provided for automatically returning said elements to initial position thereof after an adjustable predetermined number of said elements have been indexed with respect to the control means.

17. A control system for an hydraulic motor having cylinder means and ram means presenting spaced advance and return areas in said cylinder means, said system comprising means for alternately delivering hydraulic pressure fluid to and exhausting hydraulic pressure fluid from respective areas, a plurality of contacts, means movable with the ram means and operable upon engagement with a contact to actuate said delivery means to deliver pressure fluid to the return area and to exhaust pressure fluid from the advance area.

18. A system, according to claim 17, wherein means responsive to position of said ram means are provided for automatically shifting said contacts when said ram means reaches a predetermined position, and means are provided for automatically returning said contacts to initial position after the contacts have been shifted a predetermined number of times.

19. A system, according to claim 17, wherein means are provided for automatically shifting said contacts upon movement of the ram means to return position.

20. A control mechanism for an hydraulic press device having a working member and an hydraulic motor operatively associated therewith for advancing and retracting said member; comprising the combination of control means carried by the working member and operatively connected to the motor for initiating the return stroke of the working member, and means in the path of said working member on the advance stroke thereof for engaging said control means and actuating the same.

EARL CANNON.
JOHN N. HEATER.

REFERENCES CITED

The following references are of record in the file of this patent:

UNITED STATES PATENTS

| Number | Name | Date |
| --- | --- | --- |
| 971,679 | Kirby | Oct. 4, 1910 |
| 1,244,664 | Warren | Oct. 30, 1917 |
| 1,911,138 | Clute | May 23, 1933 |
| 2,324,727 | Shartle | July 20, 1943 |
| 2,350,217 | Collins | May 30, 1944 |
| 2,419,563 | Kaser | Apr. 29, 1947 |
| 2,483,712 | Schafer | Oct. 4, 1949 |